United States Patent Office 3,317,809
Patented May 2, 1967

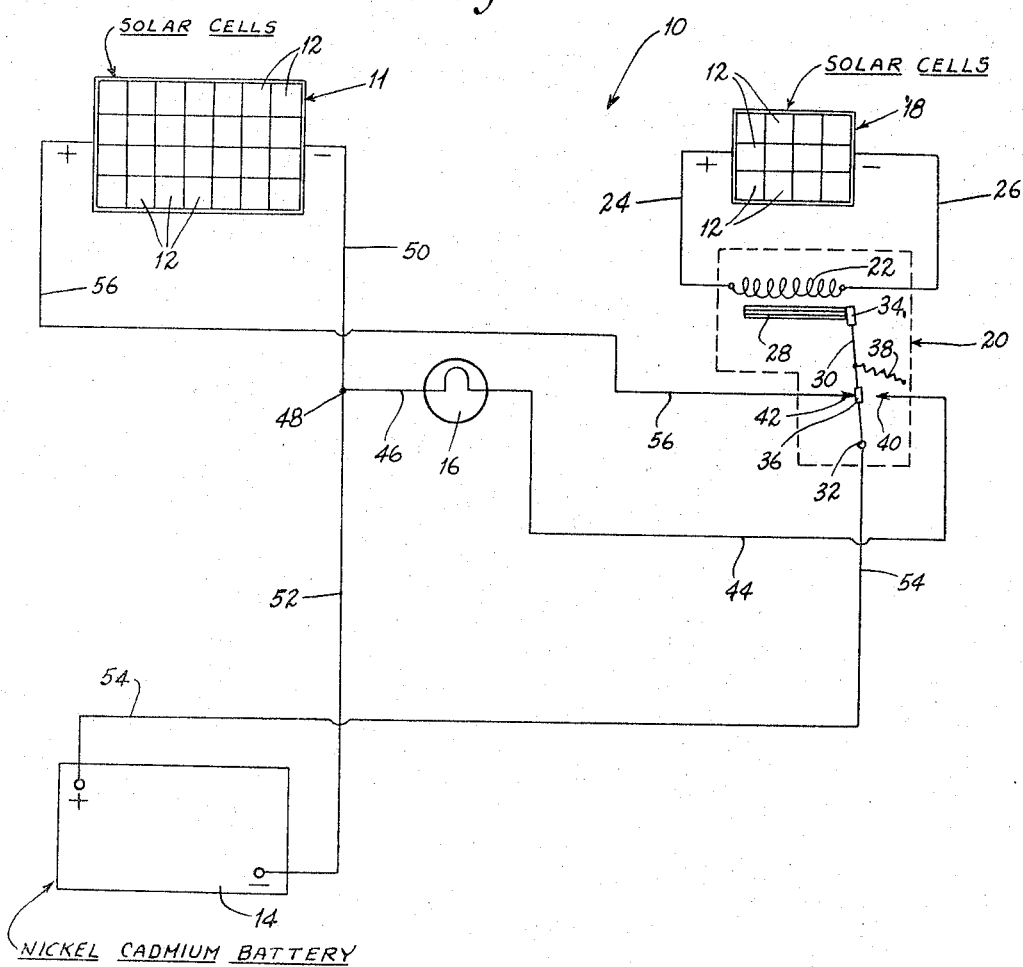
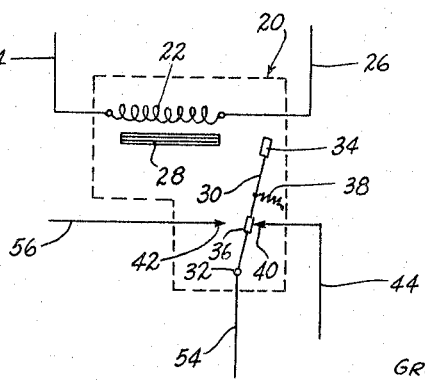

3,317,809
SELF-CONTAINED ELECTRICAL LIGHTING UNIT
Grover W. Bowers, 1724 McCready, and Francis H. Kennedy, 22 Berkshire, both of Richmond Heights, Mo. 63117
Filed Dec. 26, 1963, Ser. No. 333,416
5 Claims. (Cl. 320—30)

The present invention relates generally to the lighting art, and more particularly to a novel self-contained electrical lighting unit adapted for wide efficient use.

There has long existed the need for an efficient long-lasting self-contained electrical lighting unit which periodically automatically charges itself. Electric lights are available which are energized at night and are off in daylight, but these are connected into primary or secondary sources of generated power. Solar cells have been used in many applications, from Tel-Star to tiny experiments. But to applicants' knowledge, no one has produced a practical self-contained electric light unit for which there are so many uses.

Therefore, an object of the present invention is to provide a novel self-contained electrical lighting unit which fills the long-felt need.

In brief, the present invention comprises a bank of solar cells as a power source, a battery periodically charged thereby, a light, a two-way electromagnetic relay or switch, and a second bank of solar cells as a power source for energizing and deenergizing the relay to move its switch blade to one position and permit it to move under spring bias to the other, respectively.

Hence, another object of the present invention is to provide a novel self-contained electrical lighting unit which in corporates a minimum number of short-lived components.

Another object of the present invention is to provide a novel self-contained electrical lighting unit which periodically recharges the light power source from sunlight and is adapted for a wide range of uses, particularly in areas where there is no source of standard electrical power or other power source for electric light.

Another object of the present invention is to provide a novel self-contained electrical lighting unit which is constructed for long trouble-free performance and can be used by anyone with minimum instructions.

The foregoing and other objects and advantages are apparent from the following description, taken with the accompanying drawings, in which:

FIGURE 1 is a schematic wiring layout of a self-contained rechargeable electrical lighting unit incorporating the teachings of the present invention; and FIGURE 2 is a fragment of FIGURE 1, illustrating the two-way switch in its other position of movement.

Referring to the drawings more particularly by reference numerals, 10 indicates generally a self-contained rechargeable electrical lighting unit including the principles of the present invention. The unit 10 includes a bank 11 of solar cells 12, a rechargeable battery 14 preferably of some type which will have a long life, such as a nickel cadmium battery, an electric light 16 as an illumination source, a second bank 18 of solar cells 12, and an electromagnetic relay or switch 20.

The electromagnetic switch 20 includes an electric coil 22 one terminal of which is connected to the plus terminal of the bank 18 of solar cells 12 by a lead 24 and the other terminal of which is connected to the negative terminal of the bank 18 of solar cells 12 by a lead 26. Associated with the electric coil 22 is a magnetizable bar 28. The switch 20 also includes a switch arm or blade 30 which is pivoted at terminal 32 and which has a magnetic element 34 connected to the free end thereof in operative association with the magnetizable bar 28. Midway of the switch blade 30 is a double contact 36, the portion of the switch blade 30 between the double contact 36 and the terminal 32 being of electrically conductive material. The portion of the switch blade 30 between the double contact 36 and the member 34 is of insulative material. A tension spring 38 biases the switch blade 30 clockwise to the position of FIGURE 2 with the double contact 36 in engagement with a contact 40. A contact 42 is provided in opposed spaced position to the contact 40, the switch blade 30 closing the double-face contact 36 with the contact 42 when the member 34 is attracted by the magnetizable bar 28 on energization thereof (FIG. 1).

The electric light 16 is connected on one side to the contact 40 by a lead 44 and on its other side by a lead 46 to a terminal 48. The terminal 48 is connected by a lead 50 to the negative side of the bank 11 of solar cells 12 and by a lead 52 to the negative side of the battery 14. The positive terminal of the battery 14 is connected by a lead 54 to the terminal 32. The positive terminal of the bank 11 of solar cells 12 is connected by a lead 56 to the contact 42.

In an embodiment of the present unit 10, the switch 20 is energized to attract the member 34 at 18 milliamps and to cut out against the tension of the spring 38 at 6 milliamps. Obviously, this relationship will depend upon the particular job for which the unit 10 is constructed. Similarly, in the said embodiment of the unit 10, the battery 14 comprised a nickel cadmium battery of one and one-half volts and 23 amp-hours life at a ten hour rate, specifically an Eveready Battery No. N-85.

In the said embodiment of unit 10, solar cells 12 acquired from the International Rectifier Company were used, thirty solar cells having physical dimensions of ½″ x ⅜″ x ⅛″ being employed in banks 11 and five in bank 18. Each such solar cell 12 will develop one-half volt at eighteen milliamps in full sunlight. Much larger solar cells can be obtained today.

Referring to FIGURE 1 and assuming that the unit 10 is formed as a yard light on a farm adapted to burn all night and to shut off during the day, as light begins to reach the bank 18 of solar cells 12, sufficient energy will be developed thereby to energize the coil 22 and therethrough the bar 28 to attract the member 34 and therethrough move the switch blade 30 to the position of FIGURE 1 from the position of FIGURE 2. As the double contact 36 leaves the contact 40, the light 16 is extinguished. As the double contact 36 engages the contact 42, the bank 11 of solar cells 12 is placed in charging operation with the battery 14 through the circuit comprising the double contact 36, the contact 42, the lead 56, the bank 11 of solar cells 12, the lead 50, the contact 48, the lead 52, the battery 14, the lead 54, the terminal 32, and back to the double contact 36 by the conductive portion of the switch blade 30. The bank 11 of solar cells 12 will continue to charge the battery 14 during daylight hours.

As daylight fails and darkness approaches, the bank 18 of solar cells 12 will diminish in strength until the current supply to the coil 22 is insufficient to attract the member 34, whereupon the spring 38 becomes effective to move the switch blade 30 from the position of FIGURE 1 to the position of FIGURE 2. Thereupon, a circuit is completed through the light 16 and the battery 14 to illuminate the former, this completed circuit comprising the double contact 36, the contact 40, the lead 44, the light 16, the lead 46, the terminal 48, the lead 52, the battery 14, the lead 54, the terminal 32, and back to the double contact 36 through the conductive portion of the switch blade 30. The light 16 continues to burn through the hours of darkness, being energized by the battery 14. As daylight again begins to break upon the scene, the cycle is repeated.

It should be noted that in respect to the electrical output, the present invention can be converted to alternating current, if desired or necessary, by means of an oscillator which can be obtained upon the open market and the use of which is well known.

The present novel unit 10 is particularly adapted in areas where electric power is not available, as along roads remote from standard electric power, on farms, and other places. However, it is quite obvious that the present unit 10 can be employed under any circumstances where illumination or electrical energy is desired, as the lighting of streets, highways, tunnels, and bridges, the illumination of recreational, commercial, industrial and residential properties, the lighting of aircraft and airfield facilities, navigational aids, buoy lights and other navigational aids, and in substantially any other area where illumination is required.

It is manifest that there has been provided a novel self-contained electrical lighting unit which fulfills the objects and advantages sought therefor.

It is to be understood that the foregoing description and the accompanying drawing have been given by way of illustration and example. It is also to be understood that changes in form of the elements, rearrangements of parts, and substitution of equivalent elements, which will be obvious to those skilled in the art, are contemplated as within the scope of the present invention which is limited only by the claims which follow.

What is claimed is:

1. In combination, a self-contained electric light which comprises a battery, an electric light connected in an operative circuit with said battery, a first bank of solar cells connected in circuit with said battery for recharging thereof, a second bank of solar cells, a relay in an operative circuit with said second bank of solar cells, and a two-way switch in the circuits of said battery, light and first bank of solar cells adapted in one position of movement to complete only a circuit through said battery and first bank of solar cells for recharging of the former by the latter and in the other position of movement to complete only a circuit through said light and battery for illumination of the former by the latter.

2. The combination of claim 1 in which the energized and deenergized periods of said light are automatic.

3. The combination of claim 1 in which charging and discharging of said battery are automatic.

4. The combination of claim 1 in which the energized and deenergized periods of said light are automatic and the charging and discharging of said battery are automatic.

5. In combination, a self-contained electrical lighting unit comprising a rechargeable electric power source, electric light means connected into said rechargeable electric power source for illumination thereby, means operatively connected with said rechargeable electric power source for automatically recharging the same upon occurrence of predetermined conditions, and means operatively connected with said electric light means and said rechargeable electric power source for making and breaking the circuit therebetween upon the occurrence of predetermined conditions, said means for making and breaking the light means circuit comprising a bank of solar cells and an electric relay.

References Cited by the Examiner
UNITED STATES PATENTS

| | | | |
|---|---|---|---|
| 2,780,765 | 2/1957 | Chapin et al. | 320—2 |
| 3,222,535 | 12/1965 | Engelhardt | 320—22 X |
| 3,223,913 | 12/1965 | Kalns et al. | 320—39 |

JOHN F. COUCH, *Primary Examiner.*

S. WEINBERG, *Assistant Examiner.*